Patented Nov. 2, 1948

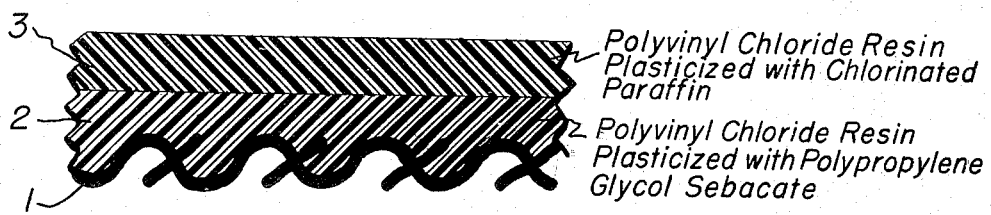

2,453,052

UNITED STATES PATENT OFFICE 2,453,052

STAIN RESISTANT PLASTICIZED POLYVINYL CHLORIDE RESIN COATINGS

Howard A. Van Etten, Newburgh, N. Y., assignor to E. I. du Pont de Nemours & Company, Wilmington, Del., a corporation of Delaware Application July 3, 1946, Serial No. 681,407

7 Claims. (Cl. 117—76)

This invention relates to resin films, and particularly to such films which are stain resistant and have little or no effect on other finishing compositions when superimposed thereon.

Synthetic resin coated fabrics and unsupported films, particularly those made with polyvinyl chloride have achieved widespread use in recent years where cellulose derivative coated fabrics have been used in the past. The new synthetic resin coated fabrics and unsupported films are generally superior to cellulose derivative coated fabrics and films in their long-wearing qualities, resistance to cracking on repeated flexing at low temperatures, leather-like feel and appearance. However, there is improvement desired in the polyvinyl chloride resin materials for certain applications. Polyvinyl chloride resin coatings have been stratified with the top or surface portion containing less plasticizer than the underneath portion in order to obtain supple materials with dry non-tacky finishes. The polyvinyl chloride resin plasticizers will migrate throughout the entire coating with resultant change in the finish of the surface layer. Another disadvantage of the plasticized films of polyvinyl chloride resin is the effect such films have on other finishes when they are superimposed thereon. Plasticized polyvinyl chloride resin films when placed in contact with lacquer type finishes will mar the lacquer finish as a result of the migration of plasticizer in the polyvinyl chloride resin film to the lacquer film exerting a solvent action on the latter. This condition is detrimental when articles fabricated from the plasticized polyvinyl chloride resin compositions such as, e. g., ladies' pocketbooks, table covers, book covers, various covered cases, etc., are placed on lacquered surfaces such as show cases and home furniture. A further disadvantage of the present day polyvinyl chloride resin coated fabric and unsupported film in light colors for use as ladies' handbags is that the material is not resistant to permanent staining by colored cosmetics. Also, table covers made from plasticized polyvinyl chloride resin compositions are not resistant to permanent staining by certain foodstuffs, such as, e. g., mustard, catsup, coffee brew, turmeric, beets, cocoa, fruit juices, fats and oils, etc.

It has been discovered that the aforementioned disadvantages of the prior art material results from the presence of the plasticizer which is an essential component of the flexible polyvinyl chloride resin films. It has been discovered that if an unplasticized polyvinyl chloride surface coat is applied over a plasticized polyvinyl chloride resin film, there is considerable initial improvement with respect to marring lacquer finishes when in contact therewith as well as resistance to permanent staining by colored cosmetics and foodstuffs. However, such advantage is not permanent since the plasticizer will migrate throughout the coating and into the surface coat and the initial improvement is nullified.

Many methods and products which are entirely satisfactory with respect to stain resistance and effect on lacquer type finishes lack suppleness and flexibility. Further improvement, therefore, is desired in the manufacture of coated fabrics with respect to pliability and suppleness. The use of an unplasticized surface stratum usually results in a film which is too stiff for use as table covers where edge drape is a desirable property.

This invention, therefore, has as a primary object the minimization or elimination of the aforementioned disadvantages inherent in the present day materials, while at the same time preserving and utilizing all the aforesaid advantageous properties thereof. A more specific object is to provide a plasticized polyvinyl chloride resin film, supported or unsupported, which is supple and resistant to staining by colored cosmetics, foodstuffs, etc. A still more specific object is the provision of a plasticized polyvinyl chloride resin film which is innocuous to lacquer type finishes and printing inks used in the bookbinding art. These as well as other important objects will become readily apparent to those skilled in the art as the description of the invention proceeds.

The above mentioned objects are accomplished according to this invention by providing a stratified polyvinyl chloride resin film containing a plasticizer in the substratum which will not migrate into the surface stratum, the surface stratum containing a halogenated hydrocarbon plasticizer which is not susceptible to staining by foodstuffs and colored cosmetics.

A non-migrating plasticizer for the polyvinyl chloride resin films has been found to be polypropylene glycol sebacate.

In the drawing the single figure represents a diagrammatic cross section through a coated fabric prepared according to the present invention. The fabric base is shown as 1; the substratum containing polyvinyl chloride plasticized with polypropylene glycol sebacate is shown as 2; and 3 indicates the surface coat which contains polyvinyl chloride plasticized with chlorinated paraffin. The coated fabric may be given a design by printing which is not shown in the drawing but may be applied to the fabric base or to the coated fabric before the surface coat is applied, that is the printing if shown, would appear between layers 2 and 3.

The following specific examples are given by way of illustration and not limitation:

EXAMPLE I

A woven cotton fabric running 2.10 yards per pound per 60" width was coated on one side with a plurality of coats of the following composition:

*Base coating composition*

| | Per cent |
|---|---|
| Polyvinyl chloride | 10.9 |
| Polypropylene glycol sebacate [1] | 8.6 |
| Methyl ethyl ketone | 80.5 |

[1] A satisfactory plasticizer of this type is sold under the trade name "Paraplex G-25" by Resinous Products and Chemical Company of Philadelphia, Pa.

The polyvinyl chloride was dispersed in the methyl ethyl ketone at a temperature of 160-170° F.

Sufficient doctor knife applications of the above composition were applied to the cloth to deposit approximately two to three ounces of the non-volatile components per square yard. After each successive coat the material was passed through a heated chamber to expel the voltatile solvent. The dry material was given a heat and pressure treatment by passing between heated smooth pressure rolls commonly referred to as calender rolls to smooth the coating and effect a greater bond between the fabric and coating. A colored decorative design was printed on the surface by means of an intaglio print roller. The formula of the printing ink was as follows:

*Printing ink composition*

| | Per cent |
|---|---|
| Polyvinyl chloride | 8.3 |
| Pigments | 18.0 |
| Polypropylene glycol sebacate | 14.5 |
| Cyclohexanone | 14.9 |
| Methyl ethyl ketone | 38.8 |
| Methyl isobutyl ketone | 5.5 |

The pigments were previously ground in the plasticizer and the resin was dispersed separately in the methyl ethyl ketone at a temperature of 160-170° F. The printed material was passed through a heated chamber to expel the volatile solvent. Additional coating of the plasticized base coating described above was applied over the printed surface to deposit approximately ½ ounce of dry coating per square yard to protect the colored print design from crocking. A final surface coat of a plasticized composition was applied to deposit approximately ½ ounce of dry coating per square yard, the formula of which was as follows:

*Surface composition*

| | Per cent |
|---|---|
| Polyvinyl chloride resin | 10.1 |
| Chlorinated paraffin (42% chlorine) | 7.4 |
| Silica gel | 1.0 |
| Methyl ethyl ketone | 81.5 |

The above composition was prepared by first dispersing a 5.1% solution of polyvinyl chloride resin in hot (160-170° F.) methyl ethyl ketone. A second dispersion was prepared by ball milling 93.4 parts of the 5.1% polyvinyl chloride resin solution with 6.6 parts of silica gel, then combining the chlorinated paraffin with the ball mill dispersion and a 14% polyvinyl chloride solution. A suitable grade silica gel for this purpose is a material obtained on the open market under the trade name "Santocel" as supplied by Monsanto Chemical Company. The silica gel is present in the above formula to give a mat finish and enhance the appearance of the coated fabric.

After the surface coat was applied to the coated fabric and passed through a heated chamber to expel the volatile solvent, the material was ready for use. The coated fabric was sufficiently supple to drape satisfactorily over the edges of a table when used as a table cover.

The table cover material produced as described above was tested for stain resistance by applying the following materials on the surface of the film: coffee brew, catsup, mustard, and red "lipstick" which were allowed to remain on the coating for 24 hours after which the staining materials mentioned above were removed with a clean cloth and left no stains on the coating. A swatch of the coated fabric was placed on a lacquer finished wooden panel with the coating in contact with the lacquer. A glass plate was placed over the swatch and a weight corresponding to 1 pound per square inch on the coated fabric was placed on the glass plate. The coated fabric was left in contact with the lacquered finish for one week and there was no marring of the lacquered finish covered with the coated fabric.

The same tests were repeated after 8 months time without any change in the initial results, thus indicating that the plasticizer in the substratum had not migrated into the surface stratum.

EXAMPLE II

A similar table cover material as described in Example I was produced except the final surface coat was replaced with the following composition:

| | Per cent |
|---|---|
| Polyvinyl chloride | 10.9 |
| Methyl ethyl ketone | 80.5 |
| Chlorinated paraffin (42% chlorine) | 8.6 |

This material was subjected to the same tests as the material described in Example I and the colored cosmetic and food-stuffs left no permanent stains on the coating. The coated fabric was sufficiently supple to drape satisfactorily over the edge of a table when used as a table cover.

Example III

Example I was repeated except the final surface coat was replaced with the following composition:

| | Per cent |
|---|---|
| Polyvinyl chloride resin | 10.1 |
| Chlorinated paraffin (70% chlorine) | 7.4 |
| Silica gel | 1.0 |
| Methyl ethyl ketone | 81.5 |

The stain resistance and suppleness of the material employing the surface coat described above were considered to be satisfactory when tested as outlined in Example I.

In place of chlorinated paraffin in Examples I, II, and III it is also possible to use brominated paraffin and achieve satisfactory stain resistance and suppleness results although the brominated material is not preferred due to its odor.

EXAMPLE IV

A table cover material as described in Example

I was produced except the final surface coat was replaced with the following composition:

| | Percent |
|---|---|
| Polyvinyl chloride | 10.1 |
| Methyl ethyl ketone | 81.6 |
| Polypropylene glycol sebacate | 7.4 |
| Silica gel | 0.9 |

In this example the non-migrating plasticizer was employed throughout the stratified coating. This material was subjected to the same tests as described in Example I, and the colored cosmetic and food-stuffs left permanent stains on the coating.

In the foregoing examples the coating compositions may be applied to the fabric base by means of an apparatus such as disclosed by W. T. Anderson in U. S. Patent 2,107,276, issued February 8, 1936. The volatile solvents may be evaporated by passing through a drying tunnel such as disclosed by W. T. Anderson et al in U. S. Patent 2,107,275, issued February 8, 1936.

Throughout the description of the invention reference has been made to polyvinyl chloride resin as the film forming ingredient of the various coating compositions. It is within the scope of this invention to use modified polyvinyl chloride resins such as, e. g., copolymers obtained by polymerizing vinyl chloride monomers with other monomers copolymerizable therewith, such as, diesters of fumaric or maleic acid including dimethyl, diethyl, dibutyl, dipropyl fumarate and maleate; copolymers of vinyl chloride and esters of acrylic acid, copolymers of vinyl chloride and vinylidene chloride, and copolymers of vinyl chloride and vinyl esters of the lower fatty acids such as vinyl acetate. In addition to the above mentioned resins, the compositions of this invention may be prepared with acrylic and methacrylic esters in polymeric form as the film forming ingredient.

The resins mentioned in the foregoing paragraph are referred to as polyvinyl resins in the appended claims.

It will be understood by those skilled in the art that the formulae for the different layers of the stratified film may be varied over rather wide limits. The end use of the coated fabric will determine ratio of resin, plasticizer and pigment to be used.

The preferred embodiment of the invention shows a transparent plasticized coating with a colored design coating sandwiched therein and a final surface coat of transparent plasticized coating. It is also within the scope of this invention to employ pigments or other coloring matter throughout the stratified coatings. The advantages of the invention are achieved by employing a nonmigrating plasticizer in the substratum of the film and a stain resistant, halogenated hydrocarbon plasticizer in the surface stratum. If the halogenated hydrocarbon is employed throughout the entire coating as the sole plasticizer for the vinyl resin, a stain resistant coating is obtained; but if the halogenated hydrocarbon plasticizer is present in sufficient quantity to result in a supple film, a waxy coating which is deficient in film properties results.

While the invention has been described in detail with respect to the manufacture of coated fabrics, it will also find wide utility in the production of unsupported films made by processes other than spreading hot solutions of the compositions such as e. g., calendering the compositions in the form of sheets as is the practice in the rubber industry.

The invention has been described with respect to table cloth material resistant to staining. In addition to these products, the invention will also be useful in producing such materials as upholstery, ladies' pocketbooks, case coverings, luggage material, bookbindings, etc.

It is apparent that many widely different embodiments of this invention may be made without departing from the spirit and scope thereof, and therefore, it is not intended to be limited except as indicated in the appended claims.

I claim:

1. A supple stratified film comprising a plurality of strata each containing a polyvinyl chloride resin, one of the said strata containing polypropylene glycol sebacate as a plasticizer for the resin, and the other strata containing chlorinated paraffin as a plasticizer for the resin.

2. The product of claim 1 in which the polyvinyl chloride resin is a homopolymer.

3. The product of claim 1 in which the chlorinated paraffin contains about 42% chlorine.

4. As a new article of manufacture, the product of claim 1 firmly bonded to a fabric base.

5. The product of claim 4 in which the polyvinyl chloride resin is a homopolymer.

6. The product of claim 4 in which the chlorinated paraffin contains about 42% chlorine.

7. The process of preparing stain-proof coated fabrics which comprises coating one side of a textile fabric with the following composition:

| | Percent |
|---|---|
| Polyvinyl chloride | 10.9 |
| Polypropylene glycol sebacate | 8.6 |
| Methyl ethyl ketone | 80.5 | repeating the application thereof until from 2 to 3 ounces of non-volatile material is applied per square yard, allowing the composition to dry, printing thereon with a pigmented composition containing polyvinyl chloride and thereafter applying a surface coat having the following composition:

| | Percent |
|---|---|
| Polyvinyl chloride | 10.1 |
| Chlorinated paraffin (42% chlorine) | 7.4 |
| Silica gel | 1.0 |
| Solvent | 81.5 |

HOWARD A. VAN ETTEN.

REFERENCES CITED

The following references are of record in the file of this patent:

UNITED STATES PATENTS

| Number | Name | Date |
|---|---|---|
| 2,086,428 | Mock | July 6, 1937 |
| 2,176,997 | Marini | Oct. 24, 1939 |
| 2,263,900 | Nollan | Nov. 25, 1941 |
| 2,312,913 | Kirby | Mar. 2, 1943 |

OTHER REFERENCES

Vinylite Copolymer Resins for Surface Coatings, published Dec. 3, 1942, by the Carbide and Carbon Chemicals Corp., pages 26 and 27.

The Resinous Reporter, a publication of the Resinous Products & Chemical Co., Philadelphia, Pa., February 1944, page 8.

Chem. and Eng. News, Dec. 10, 1944, advertisement by The Resinous Products & Chemical Co., page 2115.